United States Patent [19]

Beuchat

[11] 4,413,563
[45] Nov. 8, 1983

[54] ELECTRONIC FUSE FOR PROJECTILES
[75] Inventor: Roger Beuchat, Gland, Switzerland
[73] Assignee: Mefina S.A., Fribourg, Switzerland
[21] Appl. No.: 267,551
[22] Filed: May 27, 1981
[30] Foreign Application Priority Data
Jun. 2, 1980 [CH] Switzerland ............. 4253/80
[51] Int. Cl.³ ............................................. F42C 13/04
[52] U.S. Cl. ................................................. 102/214
[58] Field of Search .......................... 102/214, 206
[56] References Cited
U.S. PATENT DOCUMENTS

| 2,907,023 | 9/1959 | Skinner | 102/214 |
| 2,940,392 | 6/1960 | Loren et al. | 102/206 |
| 3,067,684 | 12/1962 | Euker et al. | 102/206 |
| 3,131,388 | 4/1964 | Baker | 102/214 |
| 3,802,343 | 4/1974 | Dahl | 102/214 |
| 3,874,296 | 4/1975 | Hedemark | 102/214 |

Primary Examiner—Charles T. Jordan
Attorney, Agent, or Firm—Emory L. Groff, Jr.

[57] ABSTRACT

The electronic fuse for a projectile comprises a radar emitter (2) having a resonant cavity (1) and a directional antenna (3). The presence of foreign bodies in the radar beam produces a Doppler effect which is detected by a circuit (5). This circuit (5) controls the modulation of the radar beam by means of two VHF oscillators ($F_1$, $F_2$) and the influence of the foreign body upon the modulated radar signal is analysed by the circuit (5) to determine if the foreign body corresponds to the target of the projectile or whether they are foreign bodies located accidentally on the trajectory of the projectile, for example, birds, droplets or micro-droplets of water. When the circuit (5) detects a signal corresponding to a motionless body of large dimensions, or a land, water or snow surface, it causes the firing of the projectile at a predetermined distance from the object.

5 Claims, 1 Drawing Figure

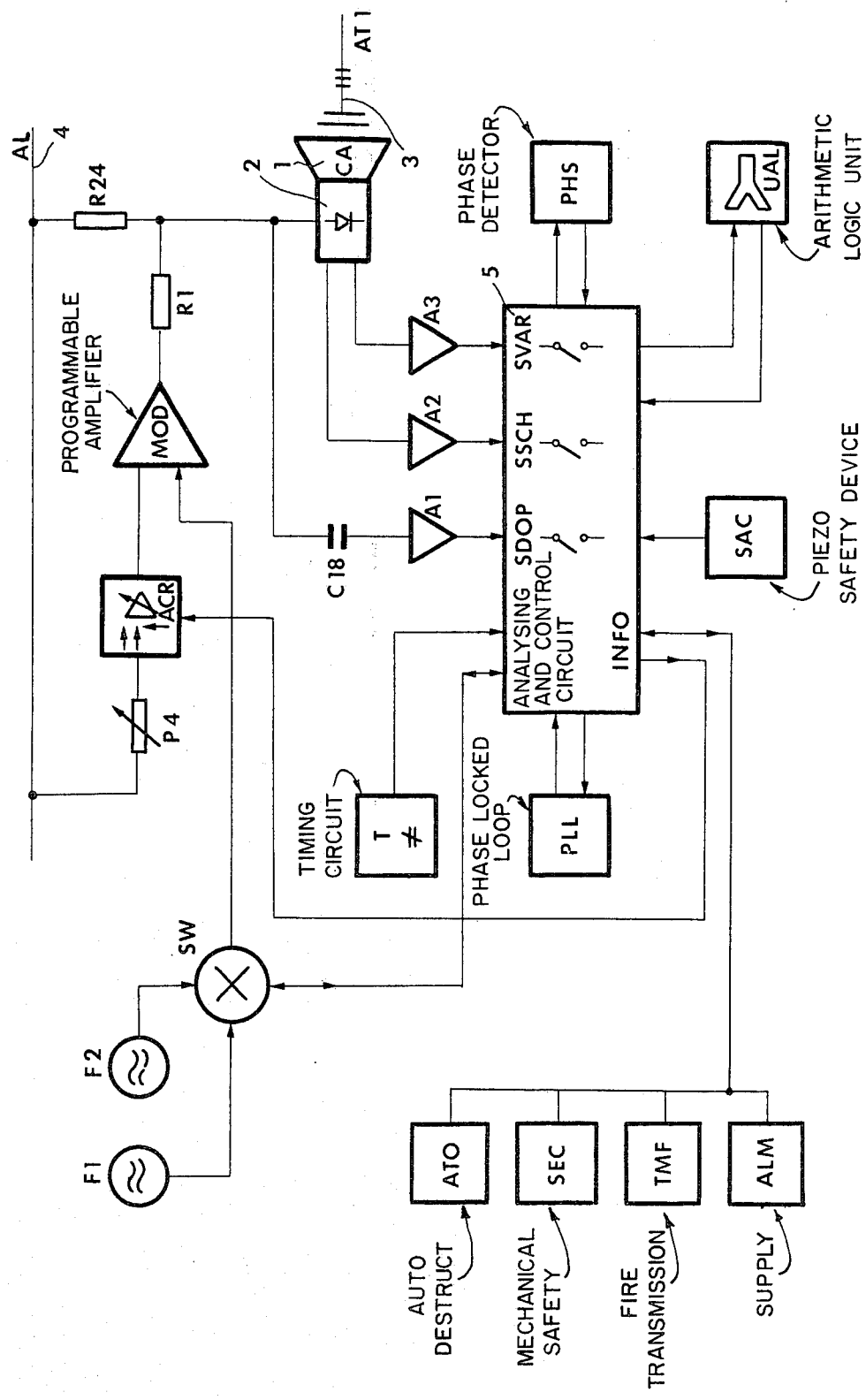

ELECTRONIC FUSE FOR PROJECTILES

The invention relates to electronic fuses for projectiles, which fuses are provided with an emitter for producing a radar signal beam which is emitted from the front of the projectile.

Known fuses of this type are principally designed to control the triggering of the projectile when the latter arrives at a predetermined distance from its object, but such present-day known fuses do not render it possible to ensure triggering at a precise distance from the object in all cases. In fact, their operation is based upon one of the following effects:

(1) The Doppler effect;
(2) The echo effect, i.e. the reflection of an emitted electronmagnetic wave;
(3) The echo effect added to the Doppler effect;
(4) The use of the frequency modulation of a radar beam.

The operation of such fuses is uncertain because it is disturbed by various factors, such as atmospheric conditions, and by different types of waves. If it is desirable to obtain a fuse whose triggering is initiated by the proximity of an object whose nature may vary from a land surface to a water or snow surface, the fuse becomes excessively sensitive and may be triggered when it approaches water vapours, fog, rain or hail, or when it receives a beam of radar frequency waves.

The object of the present invention is to provide a proximity fuse whose function does not depend in practice upon the nature of the object and is not disturbed by particular atmospheric conditions, nor by electromagnetic waves.

According to the present invention there is provided an electronic fuse for projectiles, having an emitter for producing a radar signal which is emitted in the form of a beam directed towards the front of the projectile, comprising: means for detecting the Doppler effect upon the radar signal; means for modulating the emitter of the radar signal by at least one frequency different from that of the emitted signal; means for sending at least one modulating pulse, which means are rendered active by the appearance of the Doppler effect; means for analysing the modulated signal; firing means which are rendered active when the analysis of the modulated signal complies with predetermined conditions.

The accompanying drawing shows, by way of example, the block diagram of one embodiment of the fuse according to the present invention.

The fuse comprises a radar signal emitter producing a signal of a frequency of the order, for example, of 10 GHz. This emitter is composed of a Doppler effect module which comprises, in a known manner, a resonant cavity 1 energised by a Gunn diode 2. This resonant cavity 1 is connected to a directional antenna 3 which is disposed so as to direct the radar signal, which is in the form of a relatively narrow beam and is directed towards the front of the projectile. The diode 2 is supplied by a line 4 which is connected to a source AL, of continuous current, incorporated in the projectile. The line 4 and the diode 2 are connected via a resistor R24.

As is well-known, Doppler modules are sensitive to waves reflected towards the resonant cavity 1 by an object which is moving relative to this cavity. The speed component of this movement, which is orientated towards the cavity, causes the radar frequency to shift proportionally to this component. For a radar frequency of the order of 10 GHz, this shift is approximately 67 Hz for an approach or withdrawal speed of 1 m/sec.

The difference between the frequency emitted and the frequency received constitutes the Doppler signal, this signal being transmitted via a capacitor C18 and an amplifier A1 to an electronic detecting, analysing and control circuit 5. This circuit 5 is connected to various auxiliary circuits, namely a timing circuit T, a "phase-locked loop" circuit PLL, a guided phase detector PHS, an arithmetic logic device UAL, a piezo-electric safety device SAC, and known supply circuits ALM, fire-transmitting circuits TMF, mechanical safety circuits SEC, and auto-destruct circuits ATO. The circuit 5 also has two inputs SSCH and SVAR which respectively receive, from the resonant cavity 1, a signal from a Schottky diode and a signal from a Varactor diode, after amplification in amplifiers A2 and A3.

The circuit 5 controls an electronic interrupter SW which enables two oscillators F1 and F2 to be connected which supply different, high-frequency signals to a modulator MOD acting, via a resistor R1, on the Gunn diode 2. The circuit 5 also sends a control signal to a programmable amplifier ACR whose input is connected to the supply line 4 by variable resistor P4.

The above-described fuse is intended preferably to equip a mortar shell and operates in the following manner:

From the time of firing, the supply source is charged by any suitable device, but the voltage is not applied to the Gunn diode 2 until after the operation of the piezo-electrical safety device SAC, which is of the inertial type. As soon as the shell starts its descent, the diode 2 is fed and the trigger unit becomes operational.

The radar beam has a range of a few tens of meters and, as soon as a body is located in its field, it produces a Doppler effect whose signal is transmitted to the circuit 5. The latter acts upon the interrupter SW to control a frequency modulation of the radar beam determined by the oscillator F1. The radar beam modulated to this frequency reacts in a particular manner in the presence of water vapour, so that, if the Doppler effect is produced by a cloud, a characteristic signal is obtained via the Schottky diode.

The circuit 5 then operates interrupter SW to commence modulation of the radar beam by the oscillator F2 of a different frequency. This modulation frequency is not sensitive to the effects of water vapour, so that, for this modulation, an echo is obtained only if the radar beam hits a relatively solid object. If no echo is received, the circuit 5 controls repetition of these two successive modulations for as long as the Doppler signal persists.

If the shell has passed through a blanket of fog, the Doppler effect ceases if there is no longer any object in the sensitive field of the radar beam and the fuse is again in the ready position. As soon as a Doppler signal reaches the circuit 5, the described operations recur. When a relatively solid object is located in the radar beam a signal, supplied by the Varactor diode, is obtained on the input SVAR of the circuit 5 and is analysed by the circuit 5 by means of the PLL and PHS circuits. This signal may be produced either by the approach of the chosen object, or by causes foreign to this object, for example, echos on raindrops, hailstones, birds, etc. According to the circumstances, the signal emitted by the Varactor diode has various characteristics, which are analysed by the circuit 5, and if this analysis shows that the echos are not due to the approach of the object, then the first transmitting circuit TMF is blocked and the monitoring and analysis by the circuit 5 are effected sequentially. However, as soon as the analysis of the signal emerging from the Varactor diode shows that the shell is approaching a relatively large solid surface, such as land, water, or snow, the circuit 5 measures the distance separating the shell from this surface, this being in fact effected by means of the clock T and the arithmetic logic circuit UAL. When the distance measured corresponds to that for which the explosion of the shell is desirable, this distance having been previously introduced in coded form, the circuit 5 triggers firing by means of the circuit TMF.

I claim:

1. An electronic fuse for a projectile, having an emitter for producing a radar signal which is emitted in the form of a beam directed towards the front of the projectile on which the fuse is mounted, comprising: means for detecting a Doppler effect upon the radar signal; means for modulating the emitter of the radar signal by at least one frequency different from that of the emitted signal; means for sending at least one modulating pulse, which means for sending are rendered active by the appearance of the Doppler effect; means for analysing the modulated signal; firing means which are rendered active when the analysis of the modulated signal complies with predetermined conditions.

2. An electronic fuse according to claim 1, further comprising means for modulating the radar signal by several frequencies and means for analysing the effect produced on the modulated radar signal by foreign bodies which may be located in the radar beam.

3. An electronic fuse according to claim 2, in which the modulating means are designed so as to modulate, with respect to frequency, the radar signal successively by at least two signals of different frequencies, at least one of these signals being composed of successive pulse trains.

4. An electronic fuse according to claim 3, in which the analysing means are connected to control means designed so that, as soon as the analysis of the effect produced on the radar signal does not correspond to said predetermined conditions, the control means releases a new modulation cycle for the radar signal by means of said signals.

5. An electronic fuse according to claim 1 including, means to enable it to determine that the top of the trajectory has been exceeded.

* * * * *